United States Patent
Oyamada

(10) Patent No.: US 8,837,891 B2
(45) Date of Patent: Sep. 16, 2014

(54) OPTICAL FIBER

(71) Applicant: Shin-Etsu Chemical Co., Ltd., Tokyo (JP)

(72) Inventor: Hiroshi Oyamada, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/869,972

(22) Filed: Apr. 25, 2013

(65) Prior Publication Data

US 2013/0287352 A1    Oct. 31, 2013

(30) Foreign Application Priority Data

Apr. 26, 2012    (JP) ................. 2012-101744

(51) Int. Cl.
- G02B 6/032 (2006.01)
- G02B 6/028 (2006.01)
- G02B 6/036 (2006.01)
- G02B 6/02 (2006.01)

(52) U.S. Cl.
CPC ............ G02B 6/0283 (2013.01); G02B 6/0365 (2013.01); G02B 6/02238 (2013.01)
USPC ...................................................... 385/124

(58) Field of Classification Search
USPC ...................................................... 385/124
See application file for complete search history.

(56) References Cited

U.S. PATENT DOCUMENTS

| | | | |
|---|---|---|---|
| 4,852,968 A | 8/1989 | Reed | |
| 2003/0026566 A1* | 2/2003 | Diep et al. | 385/123 |
| 2004/0234220 A1* | 11/2004 | Zhang | 385/127 |
| 2011/0058780 A1 | 3/2011 | Han | |
| 2011/0135264 A1 | 6/2011 | De Montmorillon et al. | |

FOREIGN PATENT DOCUMENTS

EP    2116877 A1    11/2009

OTHER PUBLICATIONS

Extended European Search Report for European Patent Application No. 13165550.8, issued by the European patent Office on Aug. 5, 2013.
Office Action for Korean Patent Application No. 10-2013-0022170, issued by the Korean Intellectual Property Office on Jan. 20, 2014.

* cited by examiner

*Primary Examiner* — Uyen Chau N Le
*Assistant Examiner* — Hoang Tran

(57) ABSTRACT

An optical fiber comprising a first core, a second core, a third core, and a cladding, wherein the expressions $0.30\% \leq \Delta 1 \leq 0.45\%$, $-0.05\% \leq \Delta 2 \leq 0.05\%$, $-0.35\% \leq \Delta 3 \leq -0.15\%$, $2.5 \leq b/a$, $3.5\,\mu m \leq a \leq 4.2\,\mu m$, $9\,\mu m \leq b \leq 13\,\mu m$, and $4.5\,\mu m \leq c-b \leq 7.0\,\mu m$ are satisfied, a zero-dispersion wavelength is no less than 1300 nm and no greater than 1324 nm, and transmission loss increase for a wavelength of 1550 nm when the optical fiber is wound around a mandrel with a diameter of 10 mm is no greater than 1 dB/turn.

5 Claims, 9 Drawing Sheets

| | MANUFACTURING PARAMETER | | | | | | | | OPTICAL CHARACTERISTIC | | | | | |
|---|---|---|---|---|---|---|---|---|---|---|---|---|---|---|
| | $\Delta 1$ | $\Delta 2$ | $\Delta 3$ | a | b | c | b/a | c-b | TRANSMISSION LOSS 1383nm | MFD | 2b/MFD | $\lambda_0$ | $\lambda_{cc}$ | BENDING LOSS |
| | [%] | [%] | [%] | [μm] | [μm] | [μm] | [-] | [μm] | [dB/km] | [μm] | [-] | [nm] | [nm] | [dB/t] |
| EMBODIMENT 1 | 0.364 | -0.018 | -0.292 | 3.85 | 11.09 | 17.20 | 2.88 | 6.11 | 0.283 | 8.96 | 2.48 | 1318 | 1242 | 0.172 |
| EMBODIMENT 2 | 0.410 | 0.0 | -0.285 | 3.77 | 10.62 | 15.83 | 2.82 | 5.21 | 0.294 | 8.36 | 2.54 | 1321 | 1256 | 0.143 |
| EMBODIMENT 3 | 0.384 | -0.025 | -0.345 | 3.98 | 10.12 | 14.65 | 2.54 | 4.53 | 0.315 | 8.31 | 2.44 | 1314 | 1224 | 0.053 |
| EMBODIMENT 4 | 0.335 | -0.016 | -0.164 | 4.12 | 12.76 | 16.75 | 3.30 | 4.81 | 0.288 | 8.60 | 2.97 | 1317 | 1254 | 0.432 |
| COMPARATIVE EXAMPLE 1 | 0.376 | -0.057 | -0.547 | 3.95 | 11.88 | 16.06 | 3.01 | 4.18 | 0.301 | 8.83 | 2.69 | 1339 | 1251 | 0.066 |
| COMPARATIVE EXAMPLE 2 | 0.333 | -0.013 | -0.550 | 4.16 | 11.88 | 15.49 | 2.85 | 3.61 | 0.342 | 8.92 | 2.66 | 1330 | 1241 | 0.137 |
| COMPARATIVE EXAMPLE 3 | 0.374 | -0.025 | -0.608 | 3.85 | 11.40 | 15.00 | 2.96 | 3.60 | 0.315 | 8.31 | 2.74 | 1327 | 1224 | 0.111 |

| | MANUFACTURING PARAMETER | | | | | | | TRANSMISSION LOSS 1383nm | OPTICAL CHARACTERISTIC | | | | |
|---|---|---|---|---|---|---|---|---|---|---|---|---|---|
| | Δ1 | Δ2 | Δ3 | a | b | c | b/a | | MFD | 2b/MFD | λ₀ | λcc | BENDING LOSS |
| | [%] | [%] | [%] | [μm] | [μm] | [μm] | [−] | c−b [μm] | [dB/km] | [μm] | [−] | [nm] | [nm] | [dB/t] |
| EMBODIMENT 1 | 0.364 | −0.018 | −0.292 | 3.85 | 11.09 | 17.20 | 2.88 | 6.11 | 0.283 | 8.96 | 2.48 | 1318 | 1242 | 0.172 |
| EMBODIMENT 2 | 0.410 | 0.0 | −0.285 | 3.77 | 10.62 | 15.83 | 2.82 | 5.21 | 0.294 | 8.36 | 2.54 | 1321 | 1256 | 0.143 |
| EMBODIMENT 3 | 0.384 | −0.025 | −0.345 | 3.98 | 10.12 | 14.65 | 2.54 | 4.53 | 0.315 | 8.31 | 2.44 | 1314 | 1224 | 0.053 |
| EMBODIMENT 4 | 0.335 | −0.016 | −0.164 | 4.12 | 12.76 | 16.75 | 3.30 | 4.81 | 0.288 | 8.60 | 2.97 | 1317 | 1254 | 0.432 |
| COMPARATIVE EXAMPLE 1 | 0.376 | −0.057 | −0.547 | 3.95 | 11.88 | 16.06 | 3.01 | 4.18 | 0.301 | 8.83 | 2.69 | 1339 | 1251 | 0.066 |
| COMPARATIVE EXAMPLE 2 | 0.333 | −0.013 | −0.550 | 4.16 | 11.88 | 15.49 | 2.85 | 3.61 | 0.342 | 8.92 | 2.66 | 1330 | 1241 | 0.137 |
| COMPARATIVE EXAMPLE 3 | 0.374 | −0.025 | −0.608 | 3.85 | 11.40 | 15.00 | 2.96 | 3.60 | 0.315 | 8.31 | 2.74 | 1327 | 1224 | 0.111 |

FIG. 1

| EMBODIMENT | Δ1 [%] | Δ2 [%] | Δ3 [%] | a [μm] | b [μm] | c [μm] | b/a [-] | c-b [μm] | TRANSMISSION LOSS 1383nm [dB/km] | MFD [μm] | 2b/MFD [-] | $\lambda_{cc}$ [nm] | BENDING LOSS (DIAMETER 10 mm, WAVELENGTH 1550 nm) [dB/turn] |
|---|---|---|---|---|---|---|---|---|---|---|---|---|---|
| 5a | 0.249 | -0.012 | -0.346 | 4.74 | 13.25 | 21.30 | 2.80 | 8.05 | 0.324 | 11.40 | 2.32 | 1250 | 0.361 |
| 5b | 0.303 | -0.037 | -0.345 | 4.34 | 11.31 | 18.47 | 2.61 | 7.16 | 0.338 | 9.96 | 2.27 | 1251 | 0.280 |
| 5c | 0.359 | -0.022 | -0.350 | 4.03 | 10.47 | 16.81 | 2.60 | 6.34 | 0.343 | 9.39 | 2.23 | 1249 | 0.209 |
| 5d | 0.395 | 0.002 | -0.344 | 3.77 | 9.79 | 15.59 | 2.60 | 5.80 | 0.336 | 8.78 | 2.23 | 1248 | 0.140 |
| 5e | 0.452 | -0.016 | -0.348 | 3.56 | 9.24 | 14.38 | 2.60 | 5.14 | 0.337 | 8.25 | 2.24 | 1245 | 0.104 |
| 5f | 0.520 | -0.009 | -0.348 | 3.38 | 8.79 | 13.22 | 2.60 | 4.43 | 0.320 | 7.74 | 2.27 | 1248 | 0.071 |
| 6a | 0.401 | -0.020 | -0.101 | 3.73 | 9.80 | 16.18 | 2.63 | 6.38 | 0.326 | 8.80 | 2.23 | 1252 | 1.997 |
| 6b | 0.405 | -0.015 | -0.150 | 3.75 | 9.85 | 16.26 | 2.63 | 6.41 | 0.335 | 8.72 | 2.26 | 1248 | 1.085 |
| 6c | 0.403 | -0.009 | -0.209 | 3.74 | 9.77 | 16.17 | 2.61 | 6.40 | 0.329 | 8.75 | 2.23 | 1245 | 0.622 |
| 6d | 0.401 | -0.003 | -0.260 | 3.77 | 9.78 | 16.17 | 2.59 | 6.39 | 0.348 | 8.81 | 2.22 | 1245 | 0.365 |
| 6e | 0.398 | 0.002 | -0.295 | 3.72 | 9.82 | 16.22 | 2.64 | 6.40 | 0.346 | 8.83 | 2.22 | 1244 | 0.222 |
| 6f (=5d) | 0.395 | 0.002 | -0.344 | 3.77 | 9.79 | 15.59 | 2.60 | 5.80 | 0.336 | 8.78 | 2.23 | 1248 | 0.140 |
| 6g | 0.392 | 0.005 | -0.391 | 3.78 | 9.82 | 16.23 | 2.60 | 6.42 | 0.345 | 8.81 | 2.23 | 1251 | 0.089 |

*FIG. 4*

OPTICAL FIBER

The contents of the following Japanese patent application are incorporated herein by reference: NO. 2012-101744 filed on Apr. 26, 2012.

BACKGROUND

1. Technical Field

The present invention relates to an optical fiber used for optical communication, and in particular to an optical fiber with low transmission loss of propagated light even when curved.

2. Related Art

When communicating through an access system such as FTTH that uses optical fiber for communication between a station and user homes, it is possible that the optical fiber will be curved to have a curvature between several millimeters and tens of millimeters. Therefore, for optical fiber used for wiring in the home of FTTH, low transmission loss relative to the curvature is desired. Since a long distance backbone cable is arranged in a location that is not easily affected by outside forces, e.g. in an underground duct, the bending force placed on these optical fibers is expected to result from no more than winding the optical fiber (up to 100 times) with a diameter of 60 mm within a terminal device. In contrast to this, the optical fiber inside and outside a home can bend, is light-weight, and is formed as a relatively thin cord, e.g. with a diameter of several millimeters, and therefore the optical fiber is easily affected by outside forces and often experiences a curvature radius of tens of millimeters or less.

The optical fiber propagates the signal light through the core of the optical fiber, and therefore transmission is still possible when the optical fiber is in a curved state. However, when the curvature radius is smaller, the ratio of light that leaks out of the core without being propagated increases exponentially, resulting in transmission loss. This is referred to as "bending loss." Increasing the refractive index of the core and focusing more of the light in the core is effective for reducing the bending loss, and this effect can be improved by lowering the mode field diameter (MFD). Therefore, conventional optical fiber with an MFD of approximately 6 to 8 μm is often used, in which case the bending loss when the optical fiber is wound around a mandrel (cylinder) with a diameter of 20 mm is no greater than 0.5 dB/turn for a wavelength of 1550 nm.

The MFD of an optical fiber in compliance with the ITU-TG.652 standard, which is commonly used for optical communication in a long-distance system, it approximately 8 to 10 μm, and therefore there is a problem that, when this optical fiber is connected to the optical fiber with lower MFD, the difference in MFD causes connection loss. Therefore, it is preferably that the optical fiber of an access-system have an MFD of approximately 8 to 10 μm. A trench-type optical fiber that can lower the bending loss while employing a design with high MFD is described in U.S. Pat. No. 4,852,968 and in the technical document "Optical Fiber Comprising a Refractive Index Trench" by William A. Reed. This technique has been known for a long time, but these excellent bending loss characteristics have recently attracted a lot of attention.

In the case of a quartz glass optical fiber, the core is doped with germanium to increase the refractive index and the trench portion is doped with fluorine to decrease the refractive index. Inner and outer cladding is formed by pure quartz or is doped with only a small amount of fluorine or germanium, thereby bringing the refractive index of the cladding near that of quartz.

When manufacturing a normal optical fiber base material using VAD, (1) a core (first core) and inner cladding (second core) are formed, to create a core/cladding glass intermediate body (intermediate body). Next, (2) the trench portion (third core) is formed. The trench portion can be formed by carefully depositing glass soot particles on the outside of the intermediate body, and thermally processing the resulting member in an atmosphere of a gas containing fluorine. Finally, (3) the outer cladding is formed.

At this time, the intermediate body on which the glass soot particles have been deposited is simultaneously supplied with an inert gas such as helium and a gas containing fluorine, such as $SiF_4$ or $CF_4$, as the atmospheric gas and heated to approximately 1300° C., thereby doping the trench portion with fluorine. It is known that the doping concentration of the fluorine increases in proportion to approximately the 0.25 power of the pressure of the gas containing fluorine in the atmospheric gas, and the pressure of the gas containing fluorine must be increased when the doping concentration is higher. For example, in order to achieve a relative refractive index difference ($\Delta$) of −0.6% for the trench portion, $SiF_4$ with pressure of approximately 0.7 atm is necessary, and this creates the problem that a large amount of gas containing fluorine is consumed.

Furthermore, concerning the refractive index distribution of the trench, the inner portion of the trench easily propagates higher modes of light, thereby creating a trend of increasing the cutoff wavelength. Therefore, a precise design for decreasing the core diameter is necessary. However, in the case of a design that decreases the core diameter, there is a problem that the zero-dispersion wavelength is shifted to a longer wavelength. The zero-dispersion wavelength is the wavelength at which the wavelength dispersion is zero, and when the absolute value of the wavelength scattering is large, the long-distance transmission quality decreases due to widening of the optical signal pulse, for example.

Not only is optical fiber used independently in long-distance systems and access systems, but there is also commercial demand for adopting optical fiber used in an access system in a long distance system as well, without alteration. In this case, the zero-dispersion wavelength is preferably approximately 1.31 μm, which is the optical transmission wavelength of a normal single mode optical fiber, and more preferably in a range from 1.300 to 1.324 μm.

In light of the above, it is an objective of the present invention to provide an optical fiber that exhibits a trench-type refractive index distribution with excellent bending characteristics while expanding the MFD in a range of approximately 8 to 10 μm, to provide an optical fiber that has excellent bending characteristics and low consumption of the gas containing fluorine used when doping the trench portion with fluorine, and to provide an optical fiber in which the zero-dispersion wavelength is designed to be within a range of 1300 to 1324 nm, which is equivalent to the range of a single mode optical fiber.

SUMMARY

Provided is an optical fiber comprising a first core at a center thereof, a second core that is adjacent to the first core and covers an outer circumference of the first core, a third core that is adjacent to the second core and covers an outer circumference of the second core, and a cladding that is adjacent to the third core and covers an outer circumference of the third core, wherein with a refractive index of the cladding as a reference, $\Delta 1$ is a maximum value of a relative refractive index difference of the first core, $\Delta 2$ is a relative refractive index difference of a flat portion the second core, $\Delta 3$ is a minimum value of a relative refractive index difference of the third core, a maximum value $\Delta 2max$ of the relative refractive index of the second core is $\Delta 2max=(\Delta 1)/2$, a minimum value $\Delta 2min$ of the relative refractive index of the second core is $\Delta 2min=(\Delta 3)/2$, "a" is a half-value radial width for the $\Delta 1$ of the first core, "b" is a radius of a boundary between the second core and the third core relative to the half-value radial width of $\Delta 3$ of the third core, and "c" is a radius of a boundary between the third core and the cladding, the expressions $0.30\% \leq \Delta 1 \leq 0.45\%$, $-0.05\% \leq \Delta 2 \leq 0.05\%$, $-0.35\% \leq \Delta 3 \leq -0.15\%$, $2.5 \leq b/a$, $3.5\ \mu m \leq a \leq 4.2\ \mu m$, $9\ \mu m \leq b \leq 13\ \mu m$, and $4.5\ \mu m \leq c-b \leq 7.0\ \mu m$ are satisfied, a zero-dispersion wavelength is no less than 1300 nm and no greater than 1324 nm, and transmission loss increase for a wavelength of 1550 nm when the optical fiber is wound around a mandrel with a diameter of 10 mm is no greater than 1 dB/turn.

In the optical fiber of the present invention, a mode field diameter of an LP01 mode for a wavelength of 1310 nm is no less than 8.2 μm and no greater than 10.0 μm. A cable cutoff wavelength measured for a 22-m optical fiber as defined by the ITU-T G.650 standard is no greater than 1260 nm. Furthermore, "b" is 1.21 times or more greater than a mode field diameter for a wavelength of 1310 nm. Transmission loss for a wavelength of 1383 nm is no greater than 0.35 dB/km.

BRIEF DESCRIPTION OF THE DRAWINGS

FIG. 1 is a table showing the manufacturing parameters and the optical characteristics for the 125-μm optical fibers formed as the first to fourth embodiments and the first to third comparative examples.

FIG. 4 is a table showing the manufacturing parameters and optical characteristics of 125-μm optical fibers manufactured as embodiments 5a to 5f and 6a to 6g.

DESCRIPTION OF EXEMPLARY EMBODIMENTS

Figure 2:
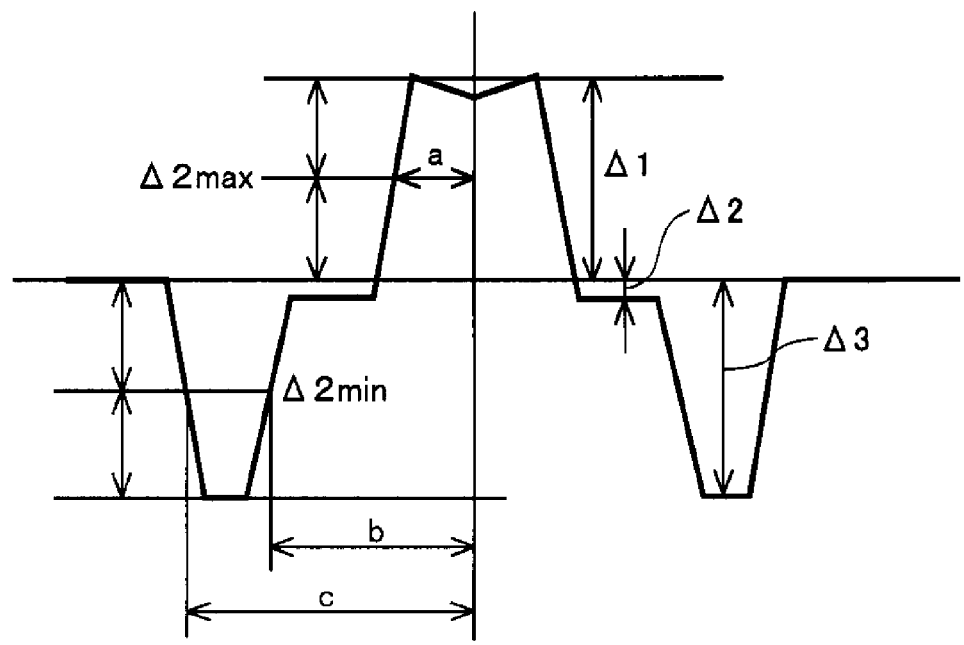
FIG. 2 is a schematic view showing a refractive index distribution of the optical fiber of the present invention.

The optical fiber of the present invention decreases transmission loss caused by bending while increasing the MFD by forming a trench-type refractive index distribution. In particular, by setting $-0.35\% \leq \Delta 3 \leq -0.15\%$ and $4.5\ \mu m \leq c-b \leq 7.0\ \mu m$, the doping amount of fluorine is restricted and the amount of gas containing fluorine used is decreased. At the same time, by restricting the higher mode propagation inside of the trench and restricting the increase in the cutoff wavelength, the zero-dispersion wavelength can be set to a value no less than 1300 nm and no greater than 1.324 μm. Furthermore, by setting $3.5\ \mu m \leq a \leq 4.2\ \mu m$, $9\ \mu m \leq b \leq 13\ \mu m$, and $b/a \geq 2.5\ \mu m$, the boundary position b of the trench can be located suitably far from the core at the center, the effect of OH groups that are prone to being mixed in near the boundary can be decreased, the transmission loss for a wavelength near 1383 nm can be decreased to no greater than 0.35 dB/km, and the increase in loss for a wavelength of 1550 nm when the optical fiber is wound around a mandrel with a diameter of 10 mm can be made 1 dB/turn or less.

A porous glass base material was formed by combining a first core and a second core, using VAD. The first core was doped with germanium to increase the refractive index. This porous glass material was heated to approximately 1200° C. in a chlorine gas atmosphere, the hydrogen groups (—OH groups) contained therein were removed, and the resulting material was heated to approximately 1600° C. in a helium gas environment, thereby forming a solid transparent glass core base material. This transparent glass core base material was elongated to have a prescribed diameter, using a glass lathe, and the prescribed outer diameter was achieved over the length thereof. At this time, OH groups are taken into the surface due to the effect of the oxyhydrogen flame of the glass lathe, but these OH groups were removed by washing the surface of the transparent glass core base material through submersion in a hydrogen fluoride solution after the elongation. Instead, an argon plasma flame may be used as the heating source of the glass lathe. In this case, OH groups are not mixed into the surface of the core base material, and therefore the process using the hydrogen fluoride solution can be omitted.

Next, silica glass microparticles were deposited on the transparent glass core base material using OVD, thereby forming the porous layer corresponding to the third core. This third core was heated to approximately 1200° C. in a chlorine gas atmosphere, the OH groups contained in the porous glass layer were removed, and the resulting material was heated to approximately 1400° C. in a gaseous atmosphere containing a mixture of silane tetrafluoride gas (flow rate of 1 liter/minute) and helium gas (flow rate of 2 liters/minute), thereby solidifying a porous glass layer while adding fluorine to the porous glass layer, to obtain the transparent glass layer with a low refractive index. Instead of silane tetrafluoride, another gas containing fluorine, such as methane tetrafluoride or ethane hexafluoride, can be used for this process.

The transparent core base material that is formed from the first core, the second core, and the third core in this way was inserted into a silica glass tube used for cladding, and heated to approximately 2000° C. while pressure inside the tube was decreased using a vacuum pump, thereby forming a transparent glass base material for use as an optical fiber in which the cladding and core portions are integrated. Not only is the transparent core base material inserted into the tube, but also a porous silica glass layer may be deposited on the outside of the transparent core base material using OVD and the resulting material may be heated to approximately 1600° C. in a helium gas atmosphere to perform transparent vitrification. The optical fiber base material manufactured in this way was heated to 2100° C. and spun to obtain an optical fiber with a diameter of 125 μm.

Figure 3:
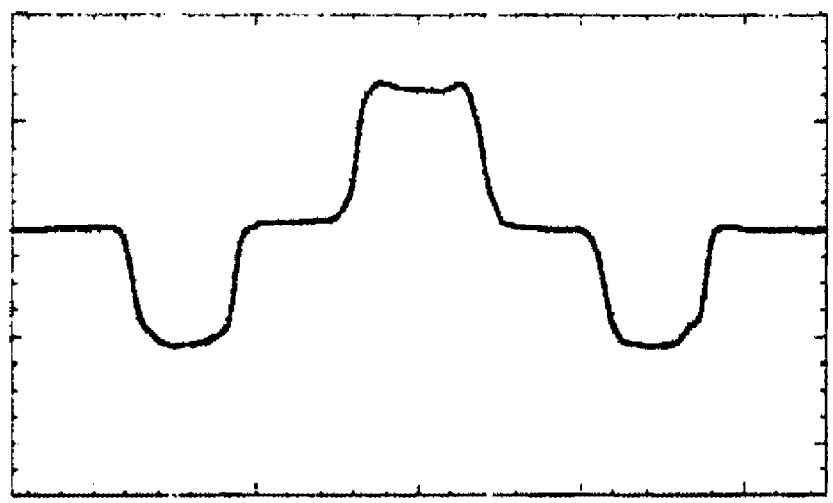
FIG. 3 is a schematic view of the refractive index distribution of the optical fiber manufactured according to the first embodiment.

Based on design values for manufacturing the optical fiber in the manner described above, the radii a, b, and c of each core, the deposition amount of the silica glass microparticles, the doping amount of germanium in the first core, and the doping amount of fluorine in the third core were each adjusted to obtain the first to fourth embodiments and the first to third comparative examples. The optical characteristics of these embodiments and comparative examples are shown together in FIG. 1. Here, λc is the zero-dispersion wavelength, and λcc is the cutoff wavelength. The bending loss is a value for a wavelength of 1550 nm when the optical fiber is wound around a mandrel with a diameter of 10 mm. The manufacturing parameters of the optical fibers according to the present invention are shown in FIG. 2, and the refractive index distribution of the optical fiber manufactured according to the first embodiment is shown in FIG. 3.

Figure 5:
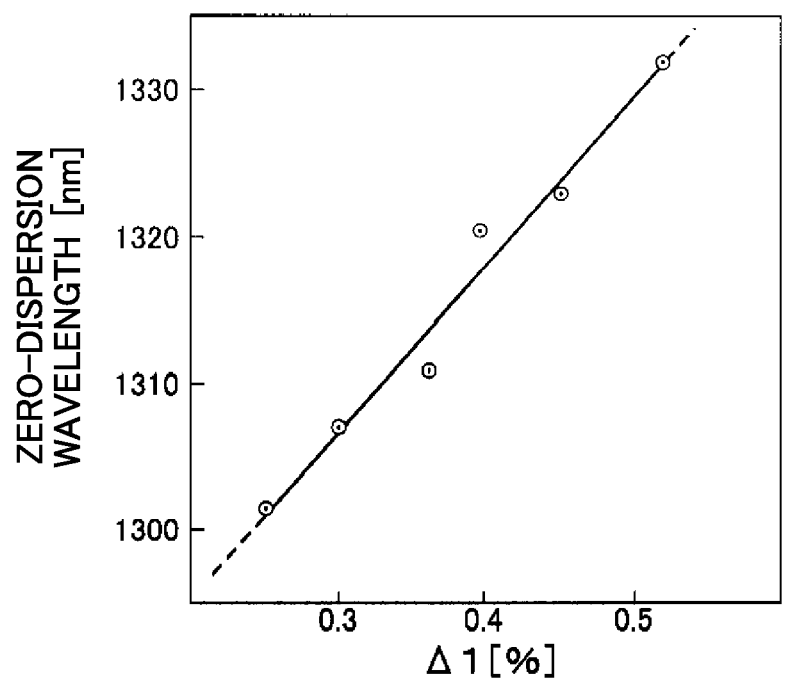
FIG. 5 is a graph showing a relationship the zero-dispersion wavelength and $\Delta 1$.
Figure 6:
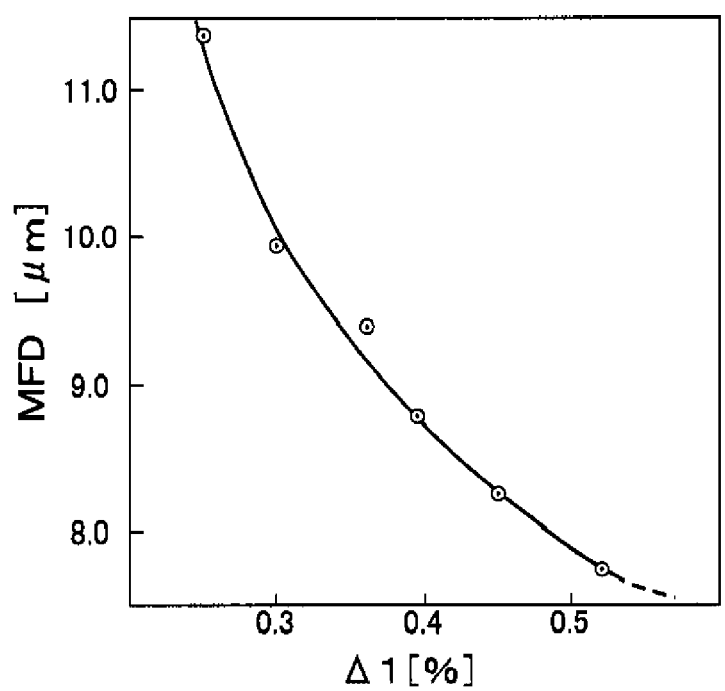
FIG. 6 is a graph showing the relationship between MFD and $\Delta 1$.
Figure 7:
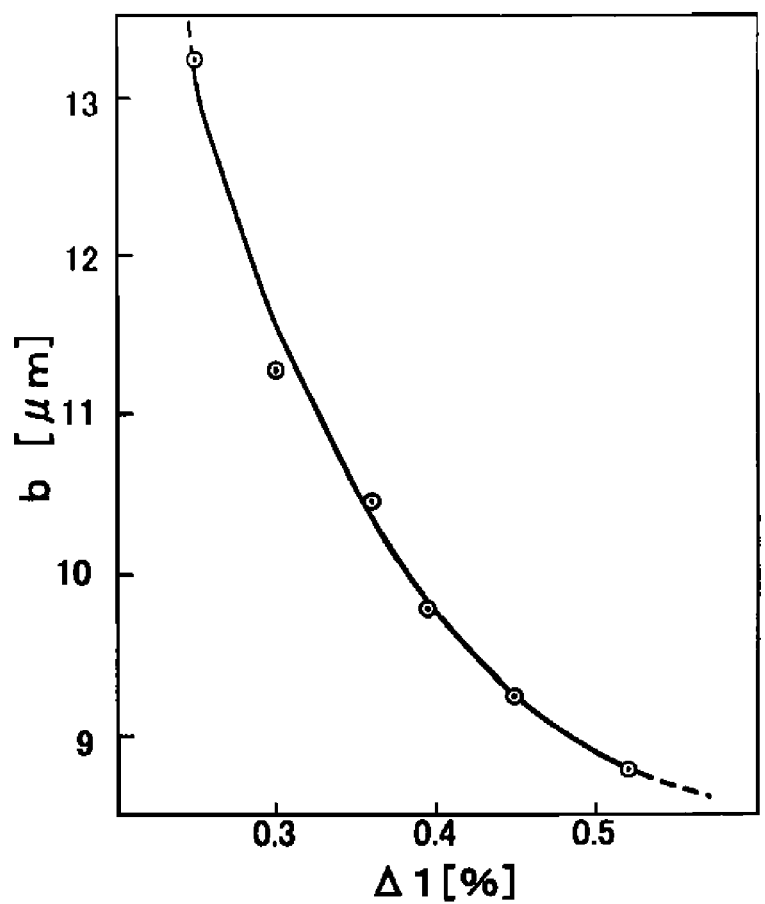
FIG. 7 is a graph showing the relationship between b and $\Delta 1$.
Figure 8:
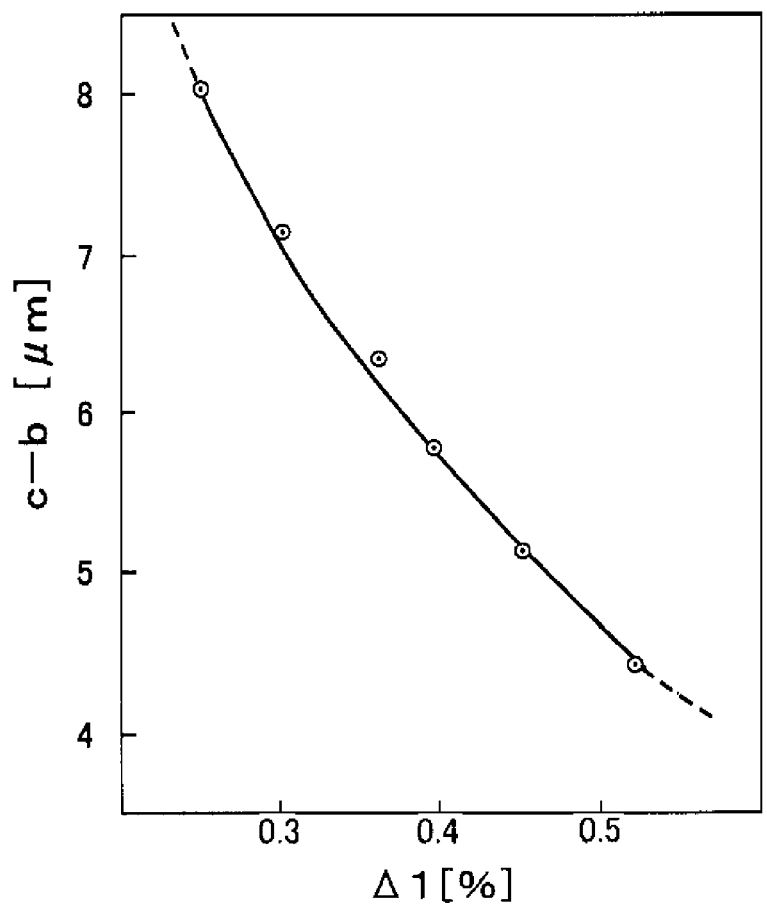
FIG. 8 is a graph showing the relationship between c−b and $\Delta 1$.

FIG. 4 is a table showing the manufacturing parameters and optical characteristics of 125-μm optical fibers manufactured as embodiments 5a to 5f and 6a to 6g. In the optical fibers according to embodiments 5a to 5f, Δ1 was changed when forming the base material such that λcc was adjusted to be approximately 1250 nm. Here, in order to match the zero-dispersion wavelength with a value of 1300 to 1324 nm, which is the optical characteristic value in a common single mode fiber, Δ1 must be no greater than 0.45%, as shown in FIG. 5. Furthermore, when matching the MFD to a value from 8.0 to 10.0 μm, which is a common optical characteristic value in a single mode optical fiber, it is necessary for Δ1 to be within a range from approximately 0.3% to 0.5%, as shown in FIG. 6. Accordingly, it is necessary for Δ1 to be approximately no less than 0.3% and no more than 0.45%. At this time, in order to adjust λcc, expansion and contraction of the core diameters a, b, and c was investigated, and it was found that b is approximately 9 to 13 μm and c−b is approximately 4.5 to 7 μm, as shown in FIGS. 7 and 8.

Figure 9:
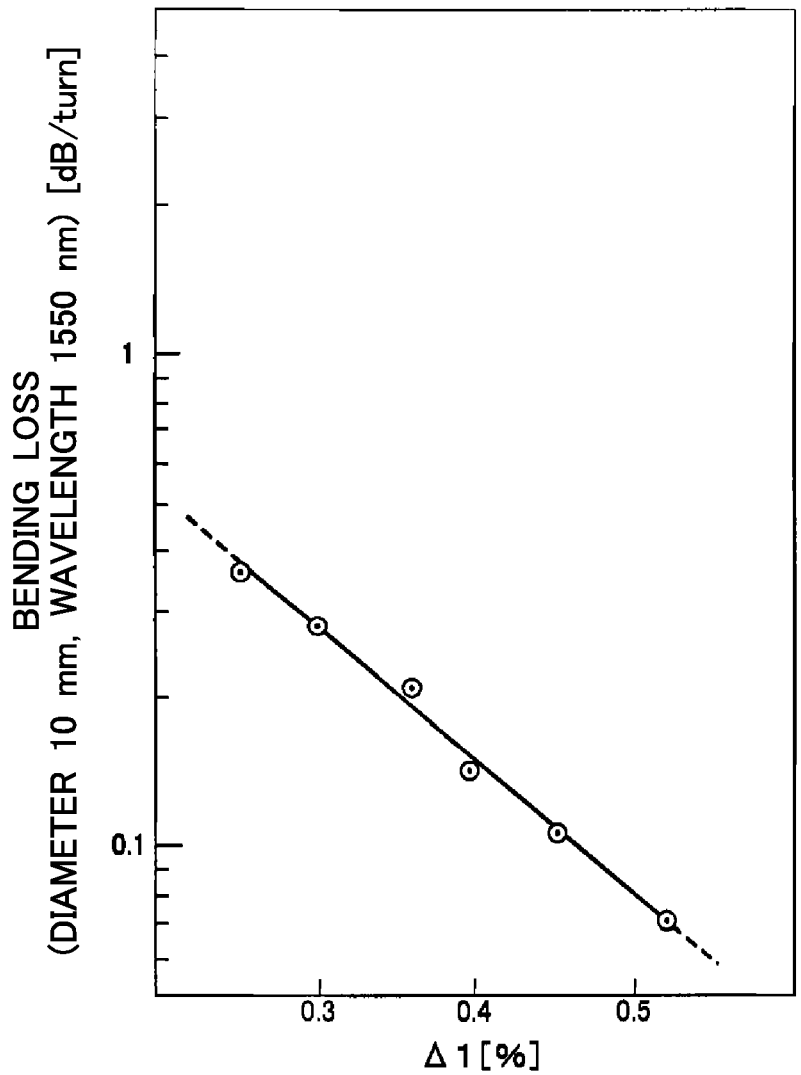
FIG. 9 is a graph showing the relationship between bending loss (diameter of 10 mm, wavelength of 1550 nm) and $\Delta 1$.

FIG. 9 is a graph showing the relationship between the bending loss (diameter of 10 mm, wavelength of 1550 nm) and Δ1 in the optical fibers of embodiments 5a to 5f. As shown in FIG. 9, the bending loss characteristic of each optical fiber according to embodiments 5a to 5f is less than 0.5 dB/turn, which is a favorable value.

Figure 10:
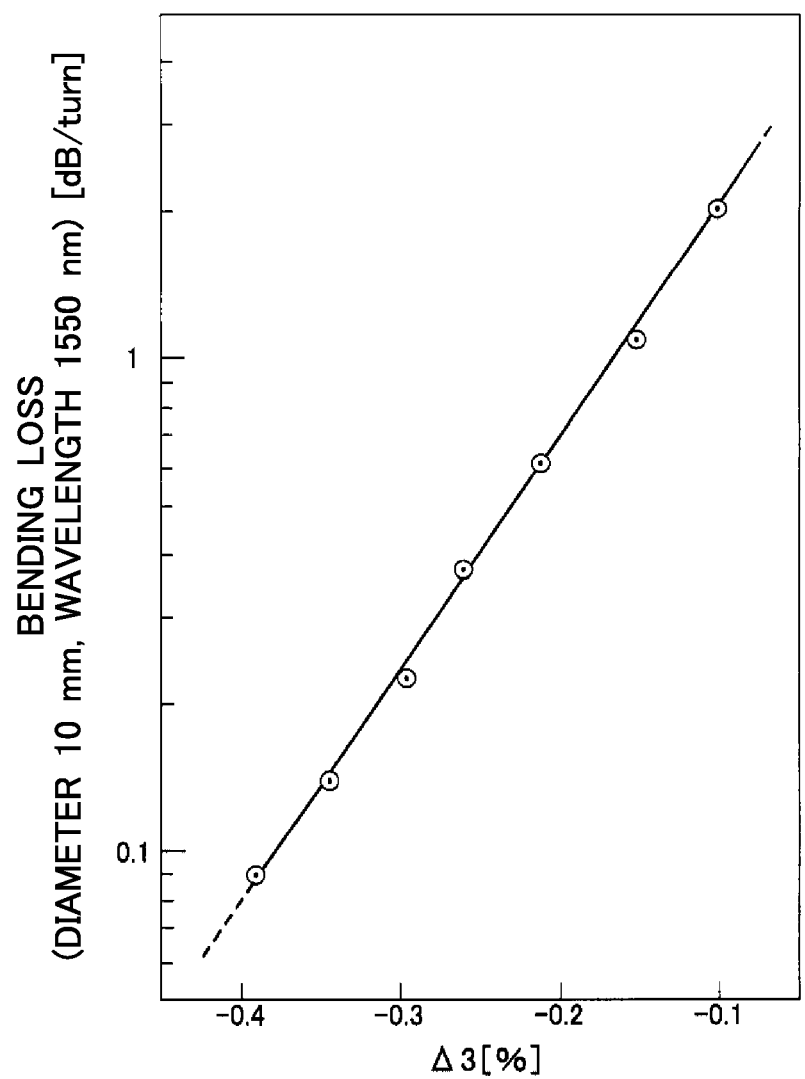
FIG. 10 is a graph showing the relationship between bending loss (diameter of 10 mm, wavelength of 1550 nm) and $\Delta 3$.

In the optical fibers according to embodiments 6a to 6g, Δ3 was changed when forming the base material such that λcc was adjusted to be approximately 1250 nm. As shown in FIG. 10, when Δ3 is smaller, the bending loss tends to be smaller as well. By setting Δ3≤−0.15%, the bending loss can be kept at 1 dB/turn or less, and by setting Δ3<0.25%, the bending loss can be made less than 0.5 dB/turn.

The minimum value Δ3 of the relative refractive index difference of the third core can be adjusted by changing the concentration pressure of the gas containing fluorine. Since Δ3 decreases in proportion to approximately the 0.25 power of the pressure of the gas containing fluorine, when Δ3 is desired to be −0.4%, for example, it is necessary for the pressure of the gas containing fluorine to be 1.7 times the pressure at the time when Δ3 is −0.35%, and therefore the amount of gas containing fluorine used is extremely large. When a large amount of gas containing fluorine is used, the amount of raw material gas and amount of processing for volatile gas also increase, which raises the cost, and therefore, from an economic perspective, it is preferable to keep the doping amount of fluorine as low as possible. Therefore, the value of Δ3 is preferably no less than −0.40%, and more preferably no less than −0.35%.

In this way, the optical fiber of the present embodiment can restrict higher mode propagation by adjusting the width of the trench portion while restricting the fluorine doping amount in the trench portion, and can cause the zero-dispersion wavelength to be no greater than 1.324 by restricting the increase in the cutoff wavelength. Furthermore, by locating the boundary position of the trench suitably far from the center of the core, the resulting optical fiber has few OH impurities and excellent bending characteristics.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An optical fiber comprising a first core at a center thereof, a second core that is adjacent to the first core and covers an outer circumference of the first core, a third core that is adjacent to the second core and covers an outer circumference of the second core, and a cladding that is adjacent to the third core and covers an outer circumference of the third core, wherein
with a refractive index of the cladding as a reference, Δ1 is a maximum value of a relative refractive index difference of the first core, Δ2 is a relative refractive index difference of a flat portion the second core, Δ3 is a minimum value of a relative refractive index difference of the third core, a maximum value Δ2max of the relative refractive index of the second core is Δ2max=(Δ1)/2, a minimum value Δ2min of the relative refractive index of the second core is Δ2min=(Δ3)/2, "a" is a half-value radial width for the Δ1 of the first core, "b" is a radius of a boundary between the second core and the third core relative to the half-value radial width of Δ3 of the third core, and "c" is a radius of a boundary between the third core and the cladding,
the expressions 0.30%≤Δ1≤0.45%, −0.05%≤Δ2≤0.05%, −0.35%≤Δ3≤−0.15%, 2.5≤b/a, 3.5 μm≤a≤4.2 μm, 9 μm≤b≤13 μm, and 4.5 μm≤c−b≤7.0 μm are satisfied,
a zero-dispersion wavelength is no less than 1300 nm and no greater than 1324 nm, and
transmission loss increase for a wavelength of 1550 nm when the optical fiber is wound around a mandrel with a diameter of 10 mm is no greater than 1 dB/turn.

2. The optical fiber according to claim 1, wherein
a mode field diameter of an LP01 mode for a wavelength of 1310 nm is no less than 8.2 μm and no greater than 10.0 μm.

3. The optical fiber according to claim 1, wherein
a cable cutoff wavelength measured for a 22-m optical fiber as defined by the ITU-T G.650 standard is no greater than 1260 nm.

4. The optical fiber according to claim 1, wherein
"b" is 1.21 times or more greater than a mode field diameter for a wavelength of 1310 nm.

5. The optical fiber according to claim 1, wherein
transmission loss for a wavelength of 1383 nm is no greater than 0.35 dB/km.

* * * * *